United States Patent [19]

Bachman

[11] 4,068,300

[45] Jan. 10, 1978

[54] DATA PROCESSING SYSTEM UTILIZING DATA FIELD DESCRIPTORS FOR PROCESSING DATA FILES

[75] Inventor: Charles W. Bachman, Lexington, Mass.

[73] Assignee: Honeywell Information Systems, Inc., Phoenix, Ariz.

[21] Appl. No.: 424,259

[22] Filed: Dec. 13, 1973

[51] Int. Cl.² .............................................. G06F 7/00
[52] U.S. Cl. ................................................... 364/200
[58] Field of Search .................... 340/172.5, 347 DD; 444/1; 364/200, 900

[56] References Cited

U.S. PATENT DOCUMENTS

| | | | |
|---|---|---|---|
| 3,422,405 | 1/1969 | Packard et al. | 340/172.5 |
| 3,654,621 | 4/1972 | Bock et al. | 340/172.5 |
| 3,680,058 | 7/1972 | De Santis et al. | 340/172.5 |
| 3,691,554 | 9/1972 | Marschall | 340/347 DD |

Primary Examiner—Leo H. Boudreau

Attorney, Agent, or Firm—William W. Holloway, Jr.; Ronald T. Reiling; Nicholas Prasinos

[57] ABSTRACT

A data field descriptor extends the flexibility of operand accesses by defining the attributes of a data field with regard to length, location and form of data representation at execution time. This delay of binding the operand accesses until execution time supports both data independence and security by permitting programs to be compiled without any restrictions imposed by the attributes of data fields. At execution time the necessary information is provided through a register so that the data field information may be correctly processed. With this feature a program is permitted to survive the change in formats of its input and output files without repeatedly undergoing the expensive operation of compilation. Also permitted is processing of files containing data field values which are not uniformly formatted throughout the file but which are self-defining through a data field descriptor.

9 Claims, 11 Drawing Figures

INSTRUCTION FORMAT

DATA DESCRIPTIONS

EXTENDED DATA DESCRIPTION

DATA PROCESSING SYSTEM UTILIZING DATA FIELD DESCRIPTORS FOR PROCESSING DATA FILES

BACKGROUND OF THE INVENTION

Related Applications

1. "Address Development Technique Utilizing a Content Addressable Memory", invented by James L. Brown and Richard P. Wilder, Jr., filed on Aug. 24, 1972, having Ser. No. 283,617 and assigned to the same assignee as the instant invention.

2. "Segment Address Development", invented by Bienvenu and filed on May 16, 1974, having Ser. No. 470,496 and assigned to the same assignee as the instant invention.

3. "Data Processing System Incorporating a Logical Move Instruction", invented by Charles W. Bachman, filed on Dec. 13, 1973, having Ser. No. 424,381 and assigned to the same assignee as the instant invention.

4. "Data Processing System Incorporating a Logical Compare-Instruction", invented by Charles W. Bachman, filed on Dec. 13, 1973, having Ser. No. 424,406 and assigned to the same assignee as the instant invention.

5. "Data Processing System Utilizing a Hash Instruction for Record Identification", invented by Charles W. Bachman, filed on Dec. 13, 1973, having Ser. No. 424,391 and assigned to the same assignee as the instant invention.

Field of the Invention

This invention relates generally to data processing system and more particularly to an apparatus and utilizing a data field description.

Description of the Prior Art

Because of the advances in data base systems, it is possible for a broad class of programs to process files of the same data base. In general, these programs have been developed over a period of months and years and represent a large investment in both human and computer resources to bring them to a point of useful productivity.

Under conventional practice, these programs must recognize the exact representations of the data as stored in the data base file or must have the data reformatted. For the latter situation, before the program can operate on the data files, the data is reformatted to a compatible form each time the data is accessed from the data file, i.e., the data is transformed from the format as stored in the data file to the format which the program recognizes. This reformatting is accomplished by subroutines and hence is slow and expensive.

When the records and files used in the data base are defined, they are done so in a form which depends primarily upon the then existing need. Since the art of data handling is not static, additional needs or requirements surface with the problem that the data files may not be in a form which is particularly suited for the new purpose. For example, it is often highly desirous to add new fields to a record, or to change the size or recording mode of some fields. Since the format of the data determines the design of the subroutines, the more versatility desired in the handling of the different kinds of data, the more complicated the subroutine becomes. The main result of these developments is to effectively freeze the original format of the data base files and the programs for extended periods of time. As a consequence, the evolution of data base structures that would normally occur is inhibited. This evolution is highly desirable to permit the data base files to better support the information system activities of the enterprise which they represent.

Historically, instructions have been defined for specific data types. By this is meant that under conventional practice, the attributes of the data field, i.e., the location of the data field, its length, encoding, etc. are determined and at compile time the description of the data is used to create the special instruction. In addition, it may be necessary during the execution of a program to select a combination of instructions for processing data whose characteristics cannot be given beforehand, but are given as a result of some preceding instruction. Thus, it is apparent that such instructions were created to include information based not only on specific data types but also for the data processor which would implement each instruction. If any of the attributes of the data field are required or desired to be changed, or if a different data processor is to be used, the instruction provided is rendered obsolete since the instruction is not capable of handling the new data. As a result, the binding of an instruction by a particular data type has also not allowed evolution of data base structures. What is desired is a system capable of incorporating developments without the attendant problems shown above.

OBJECTS OF THE INVENTION

It is a primary object of this invention to provide a data processing system which overcomes the above recited limitations.

It is a further object of this invention to provide an improved data processing system which is able to operate with a variety of data types from a plurality of sources.

It is another object of this invention to provide a data processing system which can quickly and efficiently utilize data fields in data base files.

It is yet a further object of this invention to provide data independence for data fields utilized in a data processing system by insuring independence of the program being used and independence of the data base file containing the record.

It is yet a further object of this invention to provide a data processing system which allows the separate changing of data files and/or programs with no modification of alteration of the other being required.

SUMMARY OF THE INVENTION

The foregoing objects are achieved according to one embodiment of the invention and according to one mode of operation thereof by providing in a data processing system an instruction format which incorporates data field descriptors describing the attributes and location of the data fields to be processed. In accordance with the instruction, the individual features of the data field descriptor are analyzed and compared by an arithmetic control unit in combination with a control store unit and a control interface adapter. Based on the determination made thereon, the arithmetic control unit carries out the operation specified by the instruction in accordance with the information provided by the data field descriptor. The same instruction may be used for a plurality of different data fields by incorporating different data field descriptors.

BRIEF DESCRIPTION OF THE DRAWINGS

The novel features which are characteristic of this invention are set forth with particularity in the appended claims. The invention itself, however, both as to its organization and method of operation together with further objects and advantages thereof may be best understood by reference to the following description taken in connection with the accompanying drawings in which:

DETAILED DESCRIPTION OF THE PREFERRED EMBODIMENT

Figure 1:
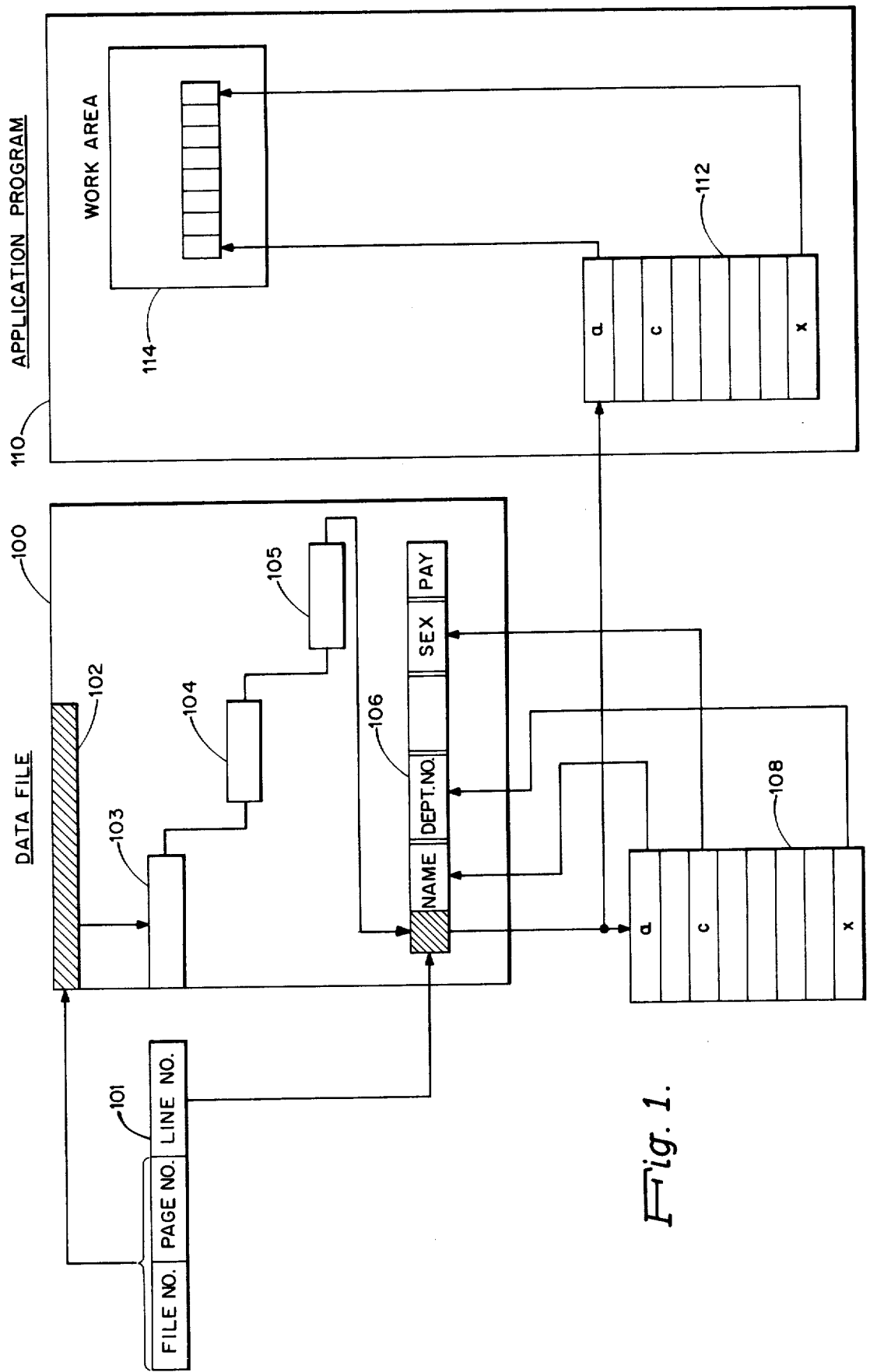
FIG. 1 is a didactic view of a data base file.

To allow a data processing system to change the form of data in its data base files and still accommodate the programs written for the data base files, a generalized approach to the utilization of data files has been provided. This generalized approach includes the use of purely logical instructions which are function oriented and represent the primative operations on data fields related to data access and control. Since these instructions are not dependent upon particular data types, they allow the possibility of walking, i.e., changing on a periodic basis, a system through a period of time without resorting to radical changes.

In accomplishing the generalized approach, the concept of data independence is used since it makes possible procedures independent of the detailed organization of the data base. As implemented in the current state of the art, data independence requires a concept of two forms of data field representations: (1) the form of the data field as supplied to the program in the processor, and (2) the form of the data field as stored on secondary storage. By utilizing data independence, programs which have been tested at considerable expense are able to be isolated from changes in the recording form, length, or location of data items which would otherwise obsolete them, In addition, data independence permits programs to be compiled with operations on data items for which the form, length, or location is not recognizable at compilation time. Moreover, data independence permits the effective encoding and decoding of data such as to assist in the security of the data itself.

To realize data independence, a data field descriptor is used. By providing a data field descriptor having the description of the data field contents and by permitting the data field descriptor to be integrated into the data processing system, data independence is achieved since the data field descriptor is carried separately from the program. Moreover, the use of a data field descriptor permits format independent instructions (move, compare, add, etc.) to be used since the data field descriptor defines the data field on a day to day basis. Thus, the data field descriptors may be easily altered to incorporate the changes into the data field. As a result, the logical instruction is only concerned with the information as it presently exists and is not limited by the specific data type. The instruction merely has to ascertain the location of the data field descriptor, which, in turn, accounts for the data field variations which were previously required to be included in the instruction itself. The data field descriptor, in combination with the instruction addresses and manipulates the data field at the time that the function of the instruction is being executed, thus, obviating the need for special instructions of conventional practice.

The data field descriptors enable data independence by specifying detailed item attributes. By this is meant, at least, the data fields involved, the type of data used, the length of data and the recording mode. Moreover, the data field descriptor enables the program to treat all data types alike since at execution time it accounts for the variations in the data structure. Thus, the information of the data field descriptor in combination with the instruction automatically determines the operation to be performed. Moreover, the same instruction may operate on different data and/or the same data with different data field descriptors thus providing increased flexibility. This provision of the same instruction used for numerous data types is a significant operation feature.

Since the data field descriptor is provided in a high speed hardware register, specialized subroutines previously required to analyze each field of the record and based upon the determination made therein, to carry out a particular transformation or operation of data are eliminated. Moreover, the subroutine concept which required repeated accesses to main memory by the operating program resulting in excessive memory instructions with a concomitant higher operating time are also eliminated since numerous memory fetches are not required in decoding the data field descriptor by the data processor. As a result, fewer steps and a significantly shorter access time is provided.

Before analyzing the apparatus which utilizes data base files, an examination of the fundamental theory of data management is provided such that a complete understanding of the invention's environment is understood. Three basic concepts of information are conceived by data management. The first type of information is an entity, i.e., a term used to describe a particular type of thing in the real world. An entity may be, for example, a person, a place, etc. With regard to each entity, there is a substructure of information. This information is called attributes of an entity and is the second type of information. Attributes have values peculiar to and describing a particular entity. For example, if describing a person, attributes about the person would be his name, weight, age, etc. The third concept of information is the relationship between entities. For example, a person has a relationship to other people he works with, to people in his family, and many other considerations.

The equivalent information systems concepts for the material world concepts of entities, attributes and relationships, are records, fields and sets. Using the analogy of a person, an entity may be presented by one or more records. A record is an assembly of zero or more fields, i.e., attributes, pertinent to a single entity. A field is the smallest piece of data distinguishable by the system. The records, e.g. the indicia about the person, are assembled into sets which recreate the relationships of the real world. Each of these information system models thus finds a basis in the storage system of a data processor.

When a user defines records and fields, he desires to utilize data in quantities which depend upon the problem. For example, for the employee, to determine his sex, only one or two bits of information may be required. To describe the same employee's education or weight, would take a longer information quantity. In order to store the equivalent data it is important to have units of different size to conveniently discuss and manipulate data. In contrast to this, the data processing system handles the data in a size which is particularly suited for manipulation by itself. While it would be ideal if the data processor would handle information having the same size as required by the user, this is not usually possible. As a result, it is often necessary to transform the description of data in the data files into a description which the program recognizes. Experience has shown this to be a very time consuming process from two aspects. First, there may be a particularized subroutine to convert the data type of a given user into the desired format, and second, there must be numerous accesses by the computer in order to utilize the subroutine.

In addition to optimizing data for particular purposes, a user may express information in a variety of different data types. By data type is meant that different forms may be utilized to express the same information. For example, to express the decimal number 10, in a base of 8 it would be encoded as 12 and in the radix 2, it would be encoded as 1010. Similarly, in computer language it is possible to encode data in a number of different data types. These include alphanumeric strings, bit strings, short logical binary data, long logical binary data, short fixed point data, long fixed point data, packed decimal data, unpacked decimal data, short floating point numbers, long floating point numbers, and extended floating point numbers. In addition, these data types may be encoded in several different codes, e.g. ASCII, EBCDIC, and BCD (binary coded decimal).

With this background, the problem of utilizing data base files is apparent. However, by incorporating a data field descriptor in the addressing scheme of a data processor, the utilization of the data base files is expedited as will be seen by an examination of the following figures.

In FIG. 1, a data structure diagram of data descriptors and data elements is shown. A data processing system 110 has many files, each of which contains a number of pages 100, only one being shown. As used herein, a file is a unit of logical storage which serves as a container for records. A file is subdivided into one or more pages 100. A page, in turn, is a unit of logical storage which is capable of holding one or more logical records.

Associated with the files in the data processing system are file descriptors 101. A file descriptor identifies the file number and page number of the logical file containing the unique information of a user required to run his business. Also included in the system are record descriptors associated with logical records and field descriptors associated with logical fields each being a subset of the former in the hierarchical scheme. Each descriptor provides information concerning the attributes of the logical structure.

In FIG. 1, block number 102 is a page header which denotes information concerning a page of the data file. This information includes the page number, any integrity mechanism and the physical mapping parameters, i.e., the location of the records contained therein. Block number 102 is shown as referencing a plurality of records 103 to 106, record 106 being shown in greater detail.

At the start of record 106 is a blocked out area called a record heading which locates a record descriptor. The record descriptor indicates the record name, record type code, record length, record access rights, etc. of a record. A record 106 is composed of one or more data fields indicated in the drawings as name, department number, pay number, sex. Each field in record 106 is associated with a field descriptor 108. The field descriptor 108 is composed of a number of data field descriptors 108a-x which identify among other things, the field name, field recording mode, field offset within the record, field length, field dimensionality, field access rights, etc. of the record occurrence.

Since the data field descriptors 108a-x describe the data fields, i.e., data about data, they may be incorporated into the page structure thus providing a formatted file. Alternatively, the descriptors 108 may be used on an operating system level basis being individually addressable. Each of these methods is envisioned in the application of the instant invention. Moreover, by maintaining the data field descriptors in the above manners, there is permitted the definition of each file structure with a minimum of interference with other file structures.

When disclosing data, the form of the data disclosed is usually implicitly defined. As an example, in COBOL when a data field is declared, the form of its use is also made known. This may be illustrated as follows. If the first field of the record 106 is a description of a person's sex, the the C field 108 may declare the field to be a bit string having a one bit length. If the second field is a department number of the person, then the X field may declare this as a character string of a certain length. Thus, the array of descriptors illustrated by block 108 provides data field descriptors which identify the attributes of the field.

In view of the fact that many records are similar, the descriptor 108 elucidating features of the data can be used for multiple occurrences. For instance, in a large company, where many thousands of employees are processed by a data processor, the record type code will point to one descriptor 108 which describes a particular format used to record information about each one of these employees. Thus, if there are 10,000 employees, only one descriptor 108 pointed to by the record descriptor is needed to describe the data fields concerning that employee. Moreover, by use of the data field descriptors, to be explained infra, the coordination required to identify the fields is automatically recognized. This coordination may be accomplished in integrated access and descriptor access products which support access to description controlled files, i.e., files where the description of the contents and structure of the data is carried separately from the program thus insuring data independence between the program and the data.

Since a particular program in a data processor 110 may not be anticipating the fields as defined in the user's data base files, it is necessary that the-program provides for its own record and data field descriptors for the same information. As a result, data independence is achieved since the data base provides for the data in one form, but the program may be utilizing the data in a completely different form. This is accomplished through descriptor 112 which defines the attributes of the data. These descriptors are stored such that they are uniquely addressable. In fact, in the system utilized herein, all data field descriptors are provided in a shared address space such that the descriptors can access and manipulate the descriptors of another process that is controlling a mutually shared record. The data fields in descriptor 112 are particularized to an individual application program. These descriptors indicate where in the work area 114 of the data processor to find the field, determine how long this field is, determine its recording mode, and other indicia which will be further explained. The data field descriptors in the data base correspond to those of the work area so that the data field content can be moved back and forth between the work area and the data base with the required reformatting.

Inherent in the above description is the basis that the data field descriptors 108 defined in the data base are format dependent upon the type of information defined by the data base administrator. Similarly the work area descriptors 112 are format dependent upon the types of information anticipated by the application program. In the discussion which follows, attention is centered about the descriptor fields describing the attributes of the data fields and purely logical instruments which in conjunction with the data field descriptors, handle the fields in the transferral from the data base files to the application program.

Referring now to FIG. 2, a logical instruction 200 which uses the data field descriptor 108 is shown. For didactic purposes, the instruction 200 is shown as referencing two fields, however, instruction 200 can reference one, two or more fields. Thus, one field would be referenced for a hash type instruction, two fields for a move, compare, etc. type instruction; and three fields for an add, subtract, etc. type instruction.

The instruction 200 can be used with any encoding scheme since the necessary features of the encoding scheme are provided to the instruction by the data field descriptors. Thus instruction 200, which can specify different types of operations to be performed on data (i.e., move, add, compare, etc.) provides for obtaining data field descriptors as part of the operation of fetching operands. Each data field descriptor 108 obtaint by the instuction 200 describes the format of a corresponding field of data 106 on which the instruction is to operate. Thus, formats of data files need not be described in the programs themselves. Moreover, the instructions of the program can remain the same even though the data field 106 itself may change with time.

Figure 2A:
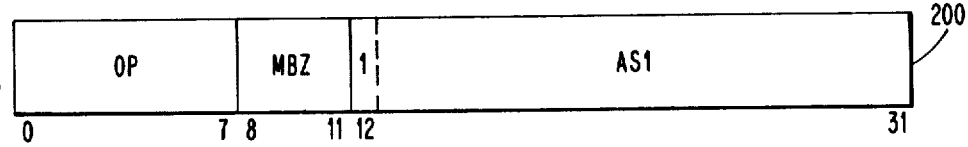
FIG. 2 is a diagram of various hardware structures utilized in the present invention.
Figure 2B:
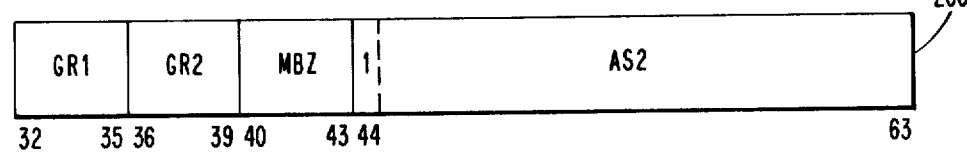

FIGS. 2a and 2b show an instruction format 200. More specifically, FIG. 2a shows a 32 bit format with the first 8 bits as an operation code, i.e., OP code. The OP code is the high order byte of an instruction and is used to identify a particular type of instruction. In this instance, the OP code may indicate a move, add, subtract, multiply, divide, compare, or hash type instruction. The next 4 bits, i.e., bits 8 to 11 are shown as MBZ which indicates that these bits must be zero. Bits 12-31 identify the first address syllable AS1 which is a logical representation of the address of the operand in memory.

For the particular type of operation utilized herein, the address syllable has its first bit, i.e., bit 12, set to a binary ONE. This bit is utilized to specify the indirect addressing mode. The data field descriptor is developed via this indirect addressing mode. While there are many alternative methods for indirect address development, (see, for example, U.S. Pat. No. 3,412,382 issued to Couleur et al, dated Nov. 19, 1968) the preferred embodiment would be as follows. In the address syllable would be a field which identifies a base register containing a segment number and an offset. The segment number references a table which provides a segment descriptor locating the segment containing a data descriptor. This data descriptor is identified by adding the offset in the base register to a displacement field in the address syllable. Thus, the location within the segment identified via the tables is provided. This data descriptor may include up to 3 words, the first word identifies the actual operand desired and the second and third work, if necessary, describes the attributes of the operand.

More specifically, the first word identifies a base register which again contains a segment number and an offset. After the segment number is referenced to tables to provide a segment descriptor locating the segment containing the operand, the offset in the base register is added to a displacement in the first word thus identifying the exact location of the operand within the segment.

FIG. 2b shows the second word of instruction 200, the second word having bits 32-63. Bits 32-35 designate a general register of the data processor 110 into which the first word developed by the address syllable is placed. Bits 36-39 indicate a second general register into which the first word developed by the second address syllable AS2 is placed. The second address syllable is shown by bits 44-63. As was the situation for the first address syllables, the second address syllable has its first bit (i.e., bit 44) set to a binary ONE to indicate indirection.

While variations of this instruction are provided and are discussed infra, in the particular instruction specified, two address syllables are utilized. For purposes of clarity, the first address syllable will be described as referencing the source field in memory and the second address syllable will be described as referencing the destination field in memory.

Each address syllable AS1 and AS2 references a data field descriptor. The first part of the data field descriptor includes only one data descriptor from those shown in FIGS. 2c to 2e as 202, 204, 206 respectively. Each of the first part of the data descriptors referenced has a tag portion in the first two bit locations. This tag portion has a code 01 which indicates that the second part of a data field descriptor, i.e., an extended data descriptor, has been specified. Moreover, the 01 tag allows factoring of the attributes of the data field. The reason for this is based on the desirability of showing the data field descriptors having certain attributes across a set of data item descriptors. Thus for example, 1000 employees can be factored for one data field descriptor. In addition, the use of the 01 tag allows the data field descriptor to be integrated into the balance of the control structure of the data processor 110. The remaining parts of the data descriptor in FIGS. 2c-2e identify the location of the operand to be processed. Thus, the STN and STE identify the segment and tables which are utilized in conjunction with the displacement to define the operand's location. For this feature, the above cited indirect addressing mode should be noted.

Figure 2C:
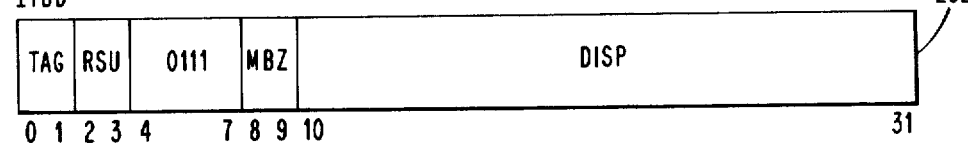
Figure 2D:
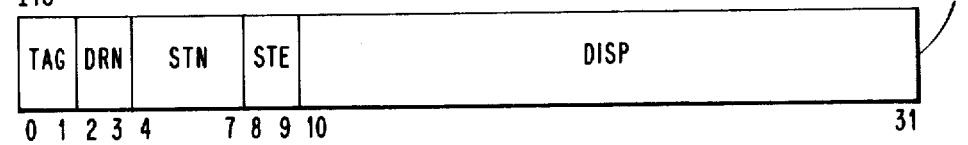
Figure 2E:
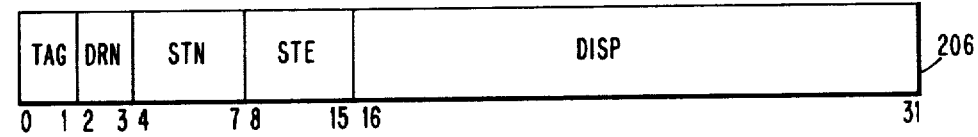
Figure 2F:
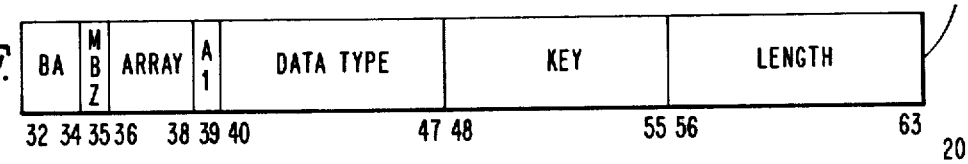

The extended data descriptor, i.e., the second part of the data field descriptor, contains at least one more word 208 as shown in FIG. 2f. This second word 208 contains information concerning the attributes of the data field in the data base file or the data field of the data processor.

In extended data descriptor 208, bits 32 to 34 define the field origin of a bit field used for the situation of bit addressing. Bits 36 and 38 of extended data descriptors 208 define array control on the data field. The format of the array control bits is as follows: Bit 36 is the IX bit or array index control bit; Bit 37 is a UB bit or upper bound control bit and bit 38 is the MPY or multiply control bit. If bit 36 contains a binary ZERO, then the extended data descriptor is describing an elementary data field. If it contains a binary ONE, the descriptor points to data in an array of data field and an index register specified in the address syllable, at bits 17 and 19, pointing to the descriptor is used for address development. If bit 37 is a binary ZERO, no upper bound check is performed. By an upperbound check is meant that the number of array elements must be within a certain size. If bit 37 is a binary ONE, the adjusted index must be less than or equal to the value of the limit field as defined in the second word of the extended data descriptor. If the value specified by the index register exceeds the limit, than an exception condition arises. If bit 38 is a binary ZERO, the adjusted index is used unmodified as a byte offset. If bit 38 is a binary ONE, the adjusted index is multiplied by the value of size field (in bytes) as defined in the second word of the extended data descriptor.

Bit 39 of extended data descriptor 208 provides for an alterability indicator bit. If it is a binary ZERO, a write operation may be performed on the data field described by the data field descriptor. If it is a binary ONE, the data field is not able to be written.

Bits 40-63 of extended data descriptor 208 define the attributes of the data field in the data base file. More specifically, bits 40-47 define the field data type. The data type is shown by an eight bit field indicating the type of data encoding. For illustrative purposes, a typical encoding may be as follows. For a binary code of 0000 0000, an alphanumeric string is indicated, for 0000 0001 an unpacked decimal (8 bits per decimal character) is indicated; for 0000 0010, a packed decimal (4 bits per decimal character) is indicated; for 0000 0011, a character string (8 bits per character) is indicated; for 0000 0100, unsigned short binary data (16 bit binary integer) is indicated; for 0000 0101, a signed short binary data (15 bit signed binary integer) is indicated; for 0000 0110, an unsigned long binary data (32 bit binary integer) is indicated; for 0000 0111 a signed long binary data (31 bit signed binary integer) is indicated; for 0000 1000, a short logical binary data (16 bits) is indicated; and, for 0000 1001, a long logical binary data 32 bits is indicated. The field data type codes from 0000 1010 to 1000 0000 may indicate a type code reserved for future expansion and may be currently illegal to use. For encoding of 1000 0000 to 1111 1111 there may be indicated data types available for software use. Each data type encoded may be used such that if valid and compatible a transformation may be performed by the data processor's apparatus. Data type validation consists of matching the type specified in the data descriptor with the type specified in the instruction for which address development is being performed.

Bits 48-55 define the key field attribute of the data structure. The key field is a description of certain features for a particular data type structure. Thus, the key field provides a secondary imposition of requirements upon the data type. The key field may contain information concerning different types of codes, e.g. ASCII, EBCIDIC or BCD or scaling factors, e.g. dollars versus dollars and cents or dimensional analysis, e.g. pounds, kilograms, etc. In operation, if the scaling factor of the data field presented to the application program from the data base file contained a millions category and if the data processor were using a normal scaling factor, there would be a difference in the scaling factors such that operation on the decimal number was not possible without conversion even though the two data types were similar. With respect to dimensionality, different encoding schemes are recognized. For example, the color teal blue may be encoded by its name, by a given number of Angstroms, or alternatively, it may be optimized on encoding by a particular user. Since each form of encoding is describing the same thing, the key field would indicate this relationship. Conversely, the dimensionality factor would not permit a field scaled as metric tons to be moved to a field scaled in units of time, distance, or any unit other than weight.

Bits 56-63 of word 208 are an eight bit length description of the data structure. The length description identifies the length of the operand. For data field operability, the operand's length may meet the following conditions: first, for a byte string, the length must be less than or equal to 256 bytes, second, for a decimal string, the length must be less than 32 digits. If the length exceeded these limits, an illegal data exception would result.

Figure 2G:
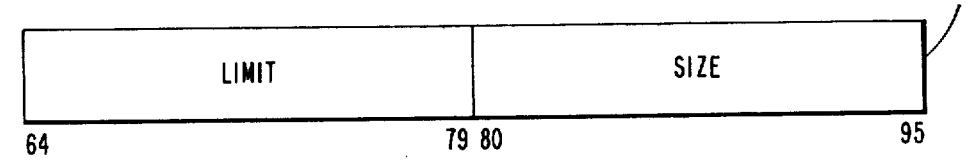

FIG. 2g shows the second word 208 of the extended data descriptor. This word is present and fetched only if the bits 37 and/or 38 of the first extended data descriptor word are a binary ONE. More specifically, the limit field, i.e., bits 64-79, exist if the upper bounds, i.e., bit 37, is equal to a binary ONE. The limit field specifies a 16 bit positive integer which is equal to the maximum number of items in the array. A lower bound of one is assumed for the array for convenience. The contents of the index register specified in the address syllable must never be less than 1. Bits 80-95 of the second word of the extended data descriptor are a 16 bit positive integer which specify in bytes the size of an item in the array. This size indication exists if bit 38 is a binary ONE. The size field indicates that the positive integer is to be multiplied by the adjusted index. When so indicated, the previously described field are checked and used in computing and calculating the computed index, T, in the following manner:

TABLE I a. (IXR) is the contents of the index register specified in the Address Syllable. (See patent on Segment Address Development cited earlier.) (Treated as 32 bit 2's complement integer.) (IXR specifies a number of items.)
b. (IXR) > 0 (This check is always made.)
c. I ← (XIR) - 1 (Creates adjusted index I.)
d. I < LIMIT (Extended to 32 bits; performed only when UB = 1.)
e. T ← I * SIZE (Performed only when MPY = 1; If MPY = O, T ← I.) I * SIZE is the computed index and is always in bytes.
f. Segment relative address ← Displacement (word O) + T (+ OFFSET of base register if extended descriptor is ITBB.) (See patent on Segmented Address Development cited earlier.) This computed index T identifies the byte which is under consideration.

As will be subsequently seen when describing the apparatus which utilizes the data field descriptor, there are three categories into which the development of the data field descriptor may reside. First, the data field descriptor may be completely hardware supported such that all processing of the data field descriptor is handled by the apparatus shown in FIG. 3 and 5. This occurs for the vast majority of situations. Second, the data field descriptor may be hardware supported but software intervention is required in order to complete the operation. This situation would occur where legal data types are recognized but different key fields are provided. In the example above, re the scaling factor, the software would be required to change the scaling factors such that they were equal. Then the hardware operation could proceed normally. Software intervention is indicated by a condition code of three which will be subsequently explained. Third, the data field descriptor in one of the significant fields is illegal, this situation causes an exception condition which the software handles. Further examples of specific instances wherein this situation arises are shown in FIG. 4.

Figure 3:
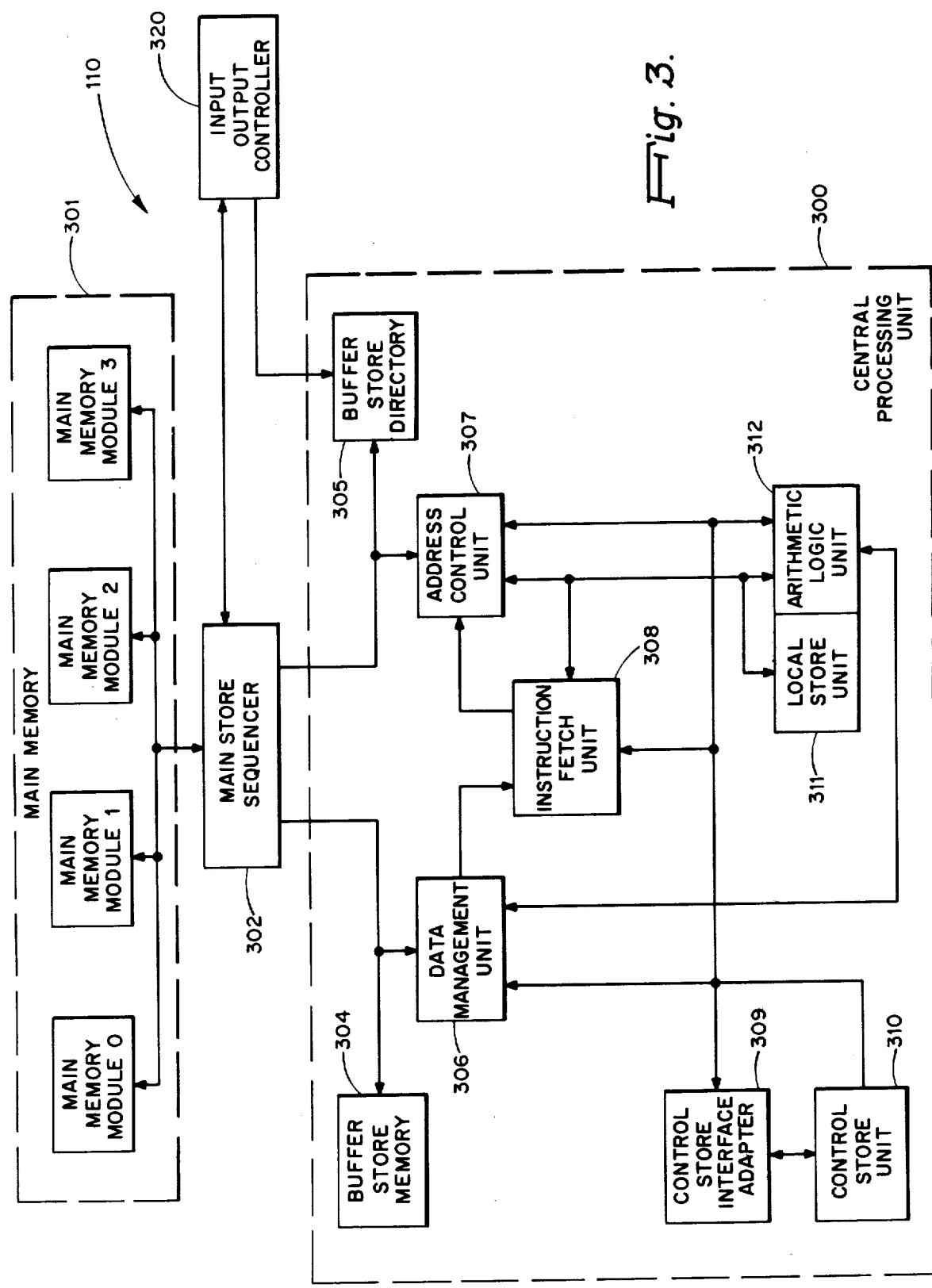
FIG. 3 is a general block diagram of a data processing system utilizing the present invention.
Figure 4:
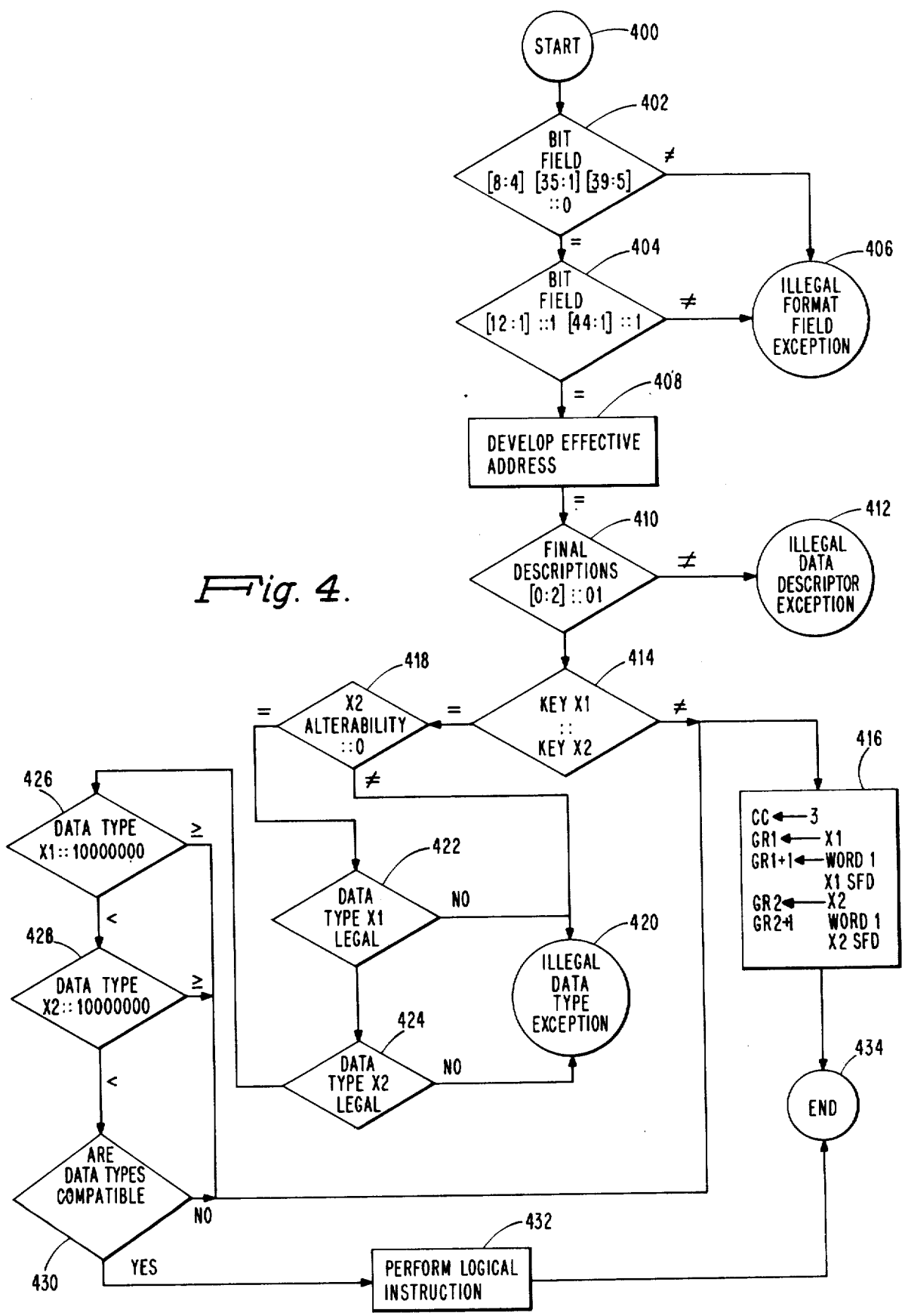
FIG. 4 illustrates a flow diagram of the use of the data field descriptor in accordance with the present invention; and, FIG. 5 is a block diagram of an embodiment of the invention utilized in the data processing system of FIG. 3 in accordance with the present invention.

The explanation of the operation of the instruction 200 and the data field descriptors it accesses will be better understood when viewing the block diagram of FIG. 3 which shows a data processing hardware system which utilizes the invention.

Referring to FIG. 3, a main memory 301 of data processor 110 is comprised of four modules of metal-oxide semiconductor (MOS) memory. The four memory modules 0–3 are interfaced to the central processor unit CPU 300 via the main store sequencer 302. The four main memory modules 0–3 are also interfaced to the peripheral subsystem such as magnetic tape units and disk drive units (not shown) via the main store sequencer 302 and the input/output controller, i.e., IOC 320. The main store sequencer gives the capability of providing access to and control of all four memory modules. Because the main storage sequencer 302 can overlap memory cycle requests, more than one memory module 0–3 may be cycling at any given time. The CPU 300 and the buffer store memory 304 and the IOC 320 can each access a double word (8 bytes) of data in each memory reference. However, in a CPU memory access, either the four high-order bytes or the four low-order bytes are selected and only four bytes of information are received in the CPU 300.

Operations of the CPU are controlled by a read only memory ROM, herein called the control store unit 310. (Control store units for implementing the invention are found in a book entitled Microprogramming: Principles and Practices by Samir S. Husson and published in 1970 by Prentice Hall Inc. Other typical control store units are described in U.S. patent to Leonard L. Kreidermacher, having U.S. Pat. No. 3,634,883 issued Jan. 11, 1972 and assigned to Honeywell Inc). Each location in the control store memory 310 can be interpreted as controlling one CPU cycle. As each location of control store is read, its contents are decoded by micro-op decode functions. Each micro-op decode function causes a specific operation within the CPU to take place. For example, control store data bits 1, 2, and 3 (not shown) being decoded as 010 could bring high a micro-op decode function that causes an A register (not shown) to a B register (not shown) transfer. Because each control store memory location may contain 30 – 80 bits, many micro-op decode functions can be brought high for each control store cycle.

By grouping locations, control store sequences are obtained that can perform a specific CPU operation or instruction. As each instruction is initiated by the CPU 300, certain bits within the op-code are used to determine the control store starting sequence. Testing of certain flops (not shown) which are set or reset by instruction decode function allows the control store memory to branch to a more specific sequence when necessary.

The control store interface adaptor 309 communicates with the control store unit 310, the data management unit 306, the address control unit 307 and the arithmetic logic unit 312 for directing the operation of the control store memory. The control store interface adapter 309 includes logic for control store address modification, testing, error checking, and hardware address generation. Hardware address generation is utilized generally for developing the starting address of error sequence or for the initialization sequence.

The buffer store memory 304 is utilized to store the most frequently used or most recently used information that is being processed by the CPU 300. The buffer store memory is a relatively small, very high speed memory which contains 128 columns and 2 rows, referred to as the upper row and the lower row. It is logically divided into preset blocks which are uniquely addressable. These blocks are called pages and each page of memory contains 32 bytes of information. A particular page may be addressed by the most significant 16 bits of the main memory address, the least significant five bits being used to address a particular byte of information within the page. Pages may be transferred from main memory to buffer store memory with a column assignment maintained —i.e., a page from column one in main memory is always transferred into column one in the buffer store memory. However, whether the information is placed on the upper or lower row of the column depends on availability. Therefore, for each column of main memory pages (for instance for a system having 256K to 2 megabytes in main memory 301 there would be 64 to 512 pages), there are two pages in buffer store. For example, column 37 in buffer store memory 304 may contain any two pages of information from column 37 in main memory. The two pages of information contained in the buffer store column at any given time depend on which pages have been most recently accessed by the CPU —i.e., the two most recently accessed pages typically reside in the buffer store memory 304.

Whether a given page of information is contained in buffer store 304 can be determined only by examining the contents of the buffer store directly 305. The buffer store directly is logically divided in the same manner as buffer store, however, instead of pages of information, each column in the buffer store directory 305 contains the main memory row address of the corresponding information in the buffer store 304. For example, if column 0 of buffer store 304 contains page 20 in the lower row and page 0 in the upper row, the buffer store directory contains 10100 and 00000 in the lower and upper row respectively. Thus, by accessing the buffer store directory 305 with the column number and comparing the requested row number with the row number contained in the buffer directory location, the CPU can determine whether a given page is contained in buffer store memory 304.

The data management unit 306 provides the data interface between the CPU 300 and main memory 301 and/or buffer store memory 304. During a memory read operation, information may be retrieved from main memory or buffer store memory. It is the responsibility of the data management unit 306 to strobe the information into the CPU registers at the proper time. The data management unit also performs the masking partial write operations.

The instruction fetch unit 308 which interfaces with the data management unit 306, the address control unit 307, the arithmetic and logic unit 312 and the control store unit 310 is responsible for keeping the CPU 300 supplied with instructions. The unit attempts to have the next instruction available in its registers before the completion of the present instraction. To provide this capability, the instruction fetch unit 308 contains a 12-word instruction register (not shown) that normally contains more than one instruction. In addition, the instruction fetch unit, under control of the control store 310, requests instructions from main memory 310 before the instruction is actually needed, thus keeping its 12-word instruction register constantly updated. Instructions are thus prefetched by means of normally unused memory cycles. The instruction fetch unit also decodes each instruction and informs the other units of the instruction's length and format.

The address control unit 307 communicates with the instruction fetch unit 308, the buffer store directory 305, the main store sequencer 302, the arithmetic logic unit 312, the data management unit 306, and the control store unit 310 via the control store interface adapter 309. The address control unit 307 is responsible for all address development in the CPU. All operations of the address control unit, including transfers to, from, and within the unit, are directed by control store micro-ops and logic in the unit. The normal cycling of the address control unit depends on the types of addresses in the instruction rather than on the type of the instruction. Depending on the address types, the address control unit may perform different operations for each address in an instruction.

The address control unit 307 also contains an associative memory that typically stores the base address of the eight most recently used memory segments, along with their segment numbers. Each time a memory request is made, the segment number is checked against the associative memory contents to determine if the base address of the segment has already been developed and stored. If the base address is contained in the associative memory, this address is used in the absolute address development, and a considerable amount of time is saved. If the base address is not contained in the associative memory, it is developed by accessing the main memory tables. However, after the base address of the segment is developed, it is stored in the associative memory, along with the segment number, for future reference.

Interfacing with the address control unit 307, the instruction fetch unit 308 and the control store unit 310 is the arithmetic logic unit 312 which is the primary work area of the CPU 300. The arithmetic logic unit's primary function is to perform the arithmetic operations and data manipulations required of the CPU. The operations of the arithmetic logic unit are completely dependent on control store micro-ops from the control store unit 310.

Associated with the arithmetic logic unit 312 and the control store unit 310 is the local store unit 311 which may be comprised of a 256 location (32 bits per location) solid state memory and the selection and read/write logic for the memory. The local store memory 311 is used to store CPU control and maintainability information. In addition, the local store memory 311 contains working locations which are primarily used for temporary storage of operands and partial results during data manipulation.

The central processing unit 300 typically contains eight base registers located in arithmetic logic unit 312 which are used in the process of address computation to define a segment number, an offset, and a ring number. The offset is a pointer within the segment and the ring number is used in the address validity calculation to determine access rights for a particular reference to a segment.

The IOC 320 is the portion of the data processing system that completes a data path from a number of peripheral subsystems to main memory. It provides the path through which peripheral commands are initiated, and it controls the resulting data transfers. The IOC can handle a maximum of 16 channel control units, and each channel control unit can accommodate one peripheral control unit. It is these peripheral control units which provide to the central processing subsystem one set of the data base files.

Figure 5:
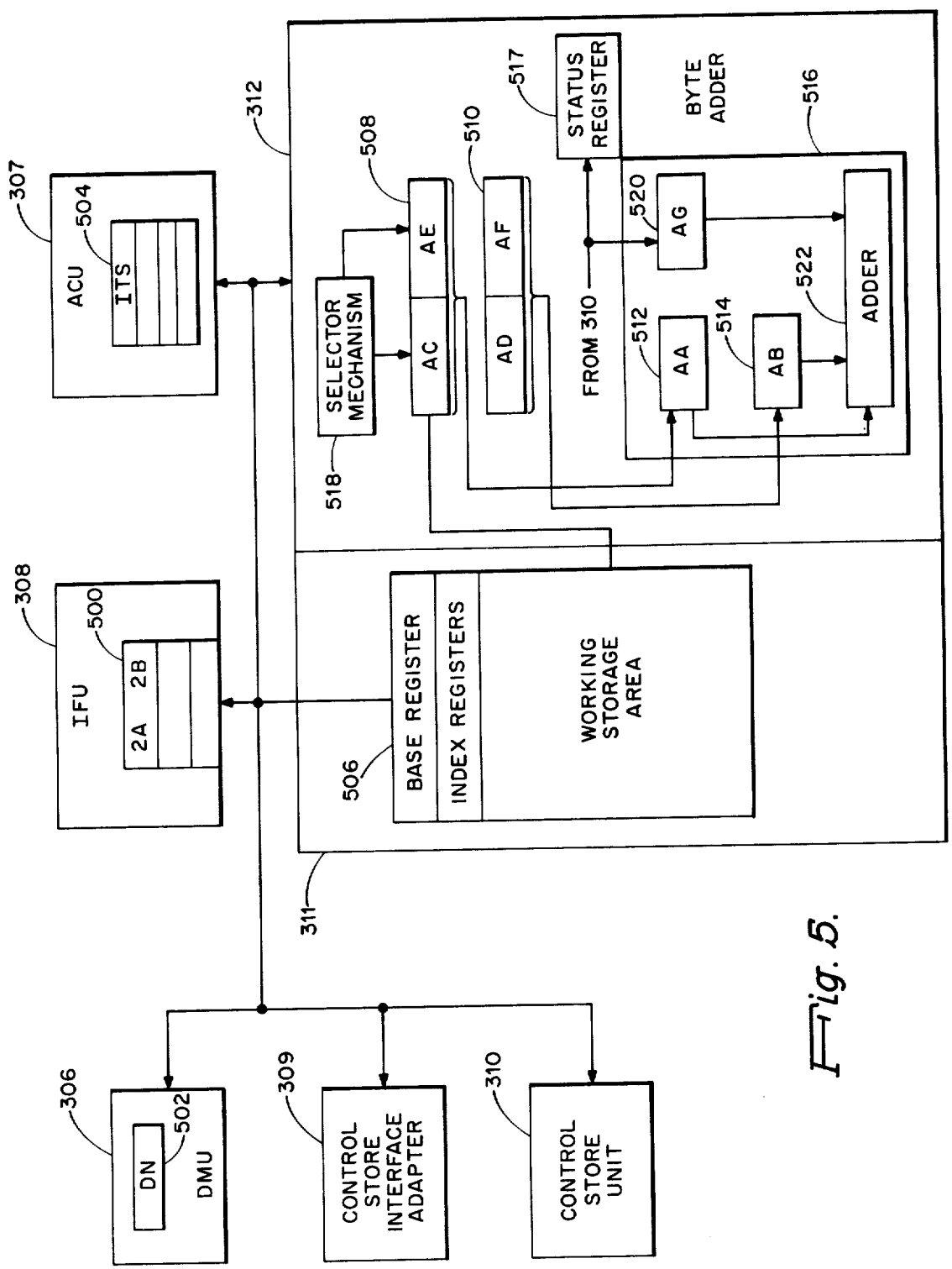

Referring now to FIG. 4 there is shown a flow diagram illustrating the steps which are used in processing the data field descriptors. The operations illustrated by FIG. 4 when read in conjunction with FIGS. 3 and 5 explain the overall timing and function of the system. FIG. 5 is a schematic diagram which shows the mechanisms for the transfers and manipulations of the data field descriptor at the system level. When FIGS. 3 and 5 are read in conjunction with the FIG. 4 flow chart, the operation and procedure of the system incorporating the data field descriptors will be understood.

Since the present invention pertains to data processing systems, the description thereof can become very complex. To prevent undue burdening of the description with matter within the knowledge of those skilled in the art, a block diagram approach has been followed, with a functional description of each block and specific identification of circuitry it represents. The individual engineer is free to select elements and components such as flip-flop circuits, shift registers, etc. from his own background as from available standard references such as "Arithmetic Operations in Digital Computers" by R. K. Richards, (Van Nostrand Publishing Company), Computer Design Fundamentals by Chu (McGraw-Hill Book Company, Inc.) and Pulse, Digital and Switching Waveforms by Millman and Taub (McGraw-Hill Book Company, Inc.). Moreover, most of the details that are relatively well known in the art will be omitted from this description. For example the transfer of information from one register to another under the operation of a control store microprogram unit is well known and is only generally indicated herein. Illustrations of single lines which may, in fact, represent plural lines for parallel transfers is well understood by those of skill in the art. Even though details are eliminated, the basic description of the entire system given in FIG. 3 will enable one skilled in the art to understand the environment in which the present invention is placed. Moreover, the same reference numerals have been used to designate corresponding elements throughout the respective use of the drawings thereby facilitating a ready understanding of the relationship therebetween.

Referring now to FIG. 4, numeral 400 indicates the beginning of the operation to utilize the data field descriptor. At this time the instruction 200 shown in FIGS. 2a and 2b is stored in the instruction register 500 of instruction fetch unit 308 shown in FIGS. 3 and 5. The operation code is detected by the control store interface adapter 309 which in turn enables control store unit 310 to provide for a series of tests to be performed upon selected bit fields of the instruction. These tests are conducted by microinstructions generated from the control store unit 310. The results of these tests are detected by control store interface adapter 309 which, depending on the tested results, may modify the next microinstruction fetch such that a related microinstruction incorporating the detected condition is generated. As is evident, a microbranch technique is provided wherein the conditioned signals received by the control store interface adapter are translated into a direct address in the control store unit 310. The operation resulting establishes a direct path for subsequent data transfers taking into account the previously detected condition. The above sequence of events occurs for each diamond illustration in FIG. 4 and is not hereafter described in complete detail. The microinstructions enable the steps shown to be quickly accomplished. These microinstruction features are further elaborated in U.S. Pat. No. 3,634,883 issued to Kreidermacher, Jan. 11, 1972 and U.S. Pat. No. 3,560,993 issued to Schwartz on Feb. 2, 1971, both assigned to the same assignee of this invention.

In step 402, bit fields 8-11, 35 and 39-44 are tested for binary ZEROS. These tests are sensed by hardware circuitry within the control store interface adapter 309 with the results controlling the operation of the control store unit 310. If the tests are successful, i.e., if the fields have binary ZEROS, then step 404 requires the testing of bit fields 12 and 44 which are the first bits of each of the address syllables. These fields are tested for binary ONES and indicate whether indirection is required. In the present situation, indirection is required since the address syllable has a 01 tag which identifies a data descriptor which is obtained by indirection.

In practice, steps 402 and 404 are executed simultaneously. If any of these fields are not present, then an illegal format field exception as shown in Step 406 is enabled which causes the control store unit 310 in combination with the control interface adapter 309 to provide for a hardware exception routine. This would be accomplished by a branch in the control store unit which would send a message to a routine such that the routine would know what kind of exception has occurred and unique information concerning the exception condition.

Bits 35 and 39 of Step 402 are set to binary ZEROS since two general registers are required for each of the address syllables. By being set to a binary ZERO the next general register is able to be used. Two general registers are required since one register stores the effective address as developed from the address syllable and the second register stores the first word of the extended data descriptor. Thus, four general registers will be utilized for the development of the instruction address syllables in FIGS. 2a and 2b.

Once it has been ascertained that an extended data descriptor is to be developed, step 408 of the flow chart is performed.

Step 408 indicates that address development is to be performed on each address syllable presented, i.e., bits 12 to 31 and bits 44 to 63 of instruction 200. In the present situation, the address syllable is used to reference a data descriptor including a first word from the group of words shown in FIGS. 2c and 2e called an effective address.

The first word has a tag field of 01 indicating that in addition to pointing to the operand, the data descriptor has a length greater than one word. These additional words, i.e., extended data descriptors shown as 208 describe the attributes of the operand being accessed by the first word. Thus, for this particular effective address development, the descriptor indicated by the indirection bit obtains a data field descriptor.

The first word of the data descriptor also contains information pointing to the location of the segment containing the operand and a relative displacement to indicate where in the segment the operand is located. By address development in the arithmetic and logic unit, the absolute address of the operand is computed and then used to access main memory. For the situation wherein 1000 employees are represented, the same data descriptor would be referenced, but this further address development would locate the operand of each of the 1000 employees by changing the contents of the base register to locate all of the 1000 operands. The effective address, i.e., the first word, will hereinafter be referred to as X1 and should be distinguished from the address syllable and the operand since each is stored in a different unit in the central processing subsystem.

In step 410, the first word which contains the effective address as shown in one of the FIGS. 2c-2e is stored in register 504 of the address control unit 307. The control store unit 310 in conjunction with the control store interface adapter 309 then tests as shown in step 410 whether the tag of the data descriptor has as its first two bits 01. These tab bits identify a data field descriptor. If the tag is correct, the first word of the extended data descriptor is read from memory. This word is read either from the main memory 301 or from the buffer store memory 304 as explained earlier. Once this word is read, it is brought into the data management unit via the DN register 502. This is a 32 bit word 208 shown in FIG. 2f. This word is then transferred from the data management unit 306 to the local store unit 311 and is stored in a working register in scratch pad memory 506. The next microinstruction transfers this first word of the extended data descriptor to a register AC 508 where a test is then performed upon the 3 bit array field, i.e. bits 36-38, to determine whether or not a second word of the extended data descriptor should be fetched. This second word is present and is fetched only if bits 37 and/or 38 of word 1 are equal to a binary ONE. This word would then be read from main memory 301 and/or the buffer store memory 304 and transferred to the data management unit 306 in the DN register 502 from which it is subsequently transferred to another working register in the scratch pad memory 506 contained in the local store unit 311. The word contained in the working location of scratch pad memory 506 is then held there until it is needed to determine the particular information about the data field of the data base file.

The same operations as described above are then performed for the second address syllable, the sole difference being the effective address from the address syllable is called X2 and second extended data descriptor is stored in AE register 510. For ease of explanation, it is assumed that only the first word of the extended data descriptor is required.

If the test on the tag of the final descriptors were unequal to 01, then the control store unit 310 would branch to an exception condition which would specify an illegal data descriptor exception and perform much in the same manner as the illegal format field exception except that different unique information would be provided to the system.

With respect to the AC register 508 and the AD register 510, it is possible to select any byte from either of these units to perform tests thereon. This can be accomplished by any well known selector mechanism 518 accessing any byte in the AC or AD registers or by shifting the contents of the AC and AD registers and then transferring the bytes. The selector mechanism is not shown in detail since not only is it well known in the art, but also to describe it would unduly burden the description.

In step 414, the above feature is utilized such that the key field from the first extended data descriptor word resident in the AC register and the key field from the second extended data descriptor word resident in the AD register are transferred to an AA register 512 and an AB register 514, respectively. The AA and AB registers are part of a byte calculator 516 which performs simple parallel addition and subtraction in accordance with the micro-operations provided by control store unit 310. Byte calculator 516 can be any parallel adder or subtraction unit well known in the art. As stated earlier, the key fields are bits 48–55 of the first word of each extended data descriptor.

Under the control of the control unit 310, the contents of the AA and AB registers are transferred to adder 522 which performs a subtraction on the key field of the two words. If the value of the two key fields are not equal, this result is fed to the control store interface adapter 309 which enables the control store unit to branch to a termination routine as shown at step 416. This would be accomplished by setting a condition code into a status register 517 in the arithmetic and logic unit to a binary value of 3. A condition code of 3 indicates that intervention is required in order to complete the operation. This value would then be interpreted by the control store unit 310 such that the word X1 and the first word of the extended data descriptor associated with the first address syllable, and word X2 and the first word of the extended data descriptor associated with the second address syllable, are transferred to the general registers in address control unit 307 as shown in step 416. However, with unlike key fields, it is possible, for example, for a routine to correct the unfavorable conditions by transforming the scaling point factor or the particular code information into a common format, and enable the remaining steps to be completed.

If a binary ZERO is generated from the byte adder 510 to the control store interface adapter 309, then it is known that the key fields match. In response to this, the control store unit 310 provides for a test of the alterability of the second operand as shown in step 418. This test may be accomplished by shifting the contents of AD register 510 such that bit 39 is in the first position of the register. The test is then performed under control of the control store unit and the results indicate whether or not the location specified is able to be written into. For example, if a code was used which was inimical to the data processing system, the A1 or alterability bit would be set to a binary ONE indicating that the data field may not be written into the second operand. If this condition existed, an illegal data type exception as shown in step 420 would be developed by the control store unit.

Subsequent to performing the alterability test, the control store unit 310 performs a test operation on the data types, i.e., bit positions 40–47 of the first word of each extended data descriptor. In step 422, the data type associated with the first address syllable is read from AC register 508 into register AA 512 via the selector mechanism 518 of the arithmetic and logic unit. Concurrently, with this a constant would be loaded into the AG register 520. The constant is within the ranges of the illegal data types. A subtraction operation is then performed between the AA register and the AG register by adder 522. The result of the subtraction determines whether or not the first operand has a legal data type.

For step 424, a similar operation for the second operand is performed with the bits 40–47 of the second extended data descriptor selected from register 510 and placed into AB register 514. If the subtraction from the constant in the AG register 520 indicates an illegal data type, then the data processing system is notified via an illegal data type exception as shown in step 420. This exception corresponds to the operation in step 406 and step 412.

If both data types are legal, then step 426 of FIG. 4 is executed. This step is accomplished by control store unit 310 generating a new constant into AG register 520 with registers 514 retaining the same information. A subtraction operation is performed by logic 522 between AA registers 512 and AG register 520. If the value is zero or greater than zero, the termination procedure of step 416 is performed. If the value is less than zero, a legal data type able to be executed by the hardware is recognized.

The same operation for the second extended data descriptor is then performed in step 428 with the unaffected contents of AB register 514 subtracted from the same constant in AG register 520. If the result provided by logic 522 is less than zero, then step 430 is sequenced. If the result is zero or greater than zero, then the condition code would be set to three in status register 517 and the general registers explained in step 416 would be loaded. It is noted that in this condition, the second word of the extended data descriptor for each address syllable is lost since the routine would not be concerned with the length and size description which the second word in the extended data descriptor provides.

At step 430, it is known that the data types are legal, and that the hardware may contain the requisite features to deal with the data types. Step 430 determines whether the data types are compatible. At this point in time, the control store unit 310 determines the data type of the first and second operands. It does this by first loading a constant into the AG register 520 and subtracting the constant from the data type loaded in the AA register 512. When a zero is tested by the control store interface adapter 309, the control store unit 310 branches to a microinstruction to test what the second data type is. The control store unit now recognizes the first data type. The same operation occurs for the testing of the second data type which is stored in AB register 514. Upon determining what the second data type is, the control store unit is now cognizant of each data type. According to this information, the control store unit does a branch operation which enables the reformatting, if necessary, of the data type to be made. This reformatting may be accomplished by sending the data to a translation device which provides a compatible data type. In addition, the reformatting feature may be different for each data processing system. For example, conversion from a packed decimal 0000 0010 to an unpacked decimal 0000 0001 may be available in all the data processing system. However, a conversion from a signed short binary data 0000 0101 to a signed long binary data 0000 0111 may be provided in only a few data processors. The compatibility types are flexible enough to be provided for a wide range of usage. This results since the logical instruction is not fixed, i.e., bound, until execution time and at that time incorporates the data field descriptors which account for the encoding differences.

Once the control store unit has determined that the data types are compatible and that a transformation may occur, step 432 of the flow chart is executed. Step 432 is a general purpose purely logical instruction which may be an add, subtract, multiply, divide, move, compare and/or hash operation. This logical instruction is performed on the total information identified by the instruction, i.e., each field has a descriptor and there may be one to three fields depending on the type of instruction. When the instruction is executed, the data field descriptors automatically account for the variations in the data fields. Previously, this function had to be performed by a specialized subroutine written for each individual data type.

Upon completion of the instruction in step 432, the next instruction in the instruction fetch unit 308 is sequenced. This completes operation on the specific operand of the data base file.

The automatic accounting feature utilized by the logical instruction includes a translation to compatible formats of the data fields. This is easily accomplished through programmable read only memories (PROMS). In addition, these PROMS are able to be utilized such that the results are returned to the original representations. For particularized examples of the transformations of the data fields in accordance with the data field descriptors, reference should be made to the co-pending applications of Charles W. Bachman previously cited.

For ease of description, the above instruction has been shown to be utilized for a data base file and an application program. However, there are at least five applications which presently may utilize data field descriptors. The source field and/or destination field may be a data file from a communication facility, a data base of a user or the internal storage of the data processor itself. Thus, the five applications provided are (1) from a communication facility to the data processor, (2) from a data base to the data processor, (3) from the data processor to the data processor, (4) from the data processor to the communications facility and (5) from the data processor to the data base.

Although a data field descriptor finalizes the information that the instruction operates on, the actual instruction has great versatility. Thus, the instruction operates differently on the same data fields if another or different data field descriptor is accessed. In essence, this would be accomplished by changing the address syllable and offset in the instruction itself thus referencing a different data descriptor which through its displacement may reference the same or different data fields. In addition, the instruction can operate on different data fields with the same data field descriptors. This would be accomplished by other instructions (not shown) determining that more records are to be processed. The reference to the new operands would be made by changing the displacement in the base register. The next absolute address development would then provide the new data since it provides a different address. As a result, the same instruction would operate on a different data field. This flexibility of the instruction allowing different forms to be utilized is a primary feature in the invention since the same functionality provided by the instruction is able to be used with a great variety of differently encoded data fields thus obviating the limitations described earlier. Moreover, by using data field descriptors not only may the same instruction be constantly used, but the data field descriptor may be changed to a currently more desirable form, thus enabling the evolution of the data base structure. This results since the data field descriptor which addresses and manipulates the data field is part of the control mechanism of the data processor and may be rewritten at any time to describe the new form of the data fields.

Moreover, the instruction can also be used in a hybrid situation wherein only one portion of the logical instruction uses the data field descriptor. As was explained earlier, the prior art in preparing the instruction required information concerning the attributes of the data fields. With this information, the instruction which could carry out the intended operation was then provided. Thus, in creating the instruction, the features of the data field were provided. A logical instruction utilizing a data field descriptor may be provided in combination with an instruction of this type. For example, the source data field and its attributes may be provided in the instruction whereas the destination field may be the logical portion of the instruction previously described and incorporating the data field descriptor. In similar manner, the source field may be the logical portion of the instruction and the destination field may have its features provided by the instruction. The third situation is the one described previously wherein both the source and destination fields are described by a logical instruction incorporating the data field descriptors. Thus, the limitation of preparing instructions based on the form of the data is effectively removed. Even if the form of the data field changes, the logical instruction and hence application program is not obsoleted since the instruction functions regardless of the data type or encoding given. This results since the data field descriptor is changed for the new data and the instruction does not operate on the data field descriptor until execution time. Thus, the nature of the data itself is, in every case, revealed only at execution time allowing the changes of the data fields through time to be made without having to reflect in the program the changes made in the data files. Economy is thus provided in not having to rewrite or retest the program. In the hybrid situation just described, the versatility is limited since the above changes would have to be made for the part of the instruction not dealing with the data field descriptor.

Moreover, the versatility of the instruction is enhanced by the ability to successively access data fields and perform its intended operation. For example, if it is required to move ten data fields, the same move instruction may be accessed for each field. Thus, by other means (not shown) the offset of the address syllable would be changed. However, the logical move instruction would account for the different encoding schemes at execution time via the data field descriptors accessed. Thus the ability to change the encoding schemes from execution to execution is another primary feature recognized by this invention. The well known loop used for moving data fields in the prior art would be applicable for moving successive fields but instead of requiring different move instructions based on each data field only one move instruction is necessary.

What is claimed is:

1. An apparatus for processing data fields having a plurality of different data structures, said apparatus comprising:

first memory means for storing said data fields and data field descriptors, said data field descriptors having a plurality of fields describing attributes of said associated data fields, second memory means for storing signals which represent a logical instruction, addressing means coupled to said first and said second memory means for indirectly accessing said data fields by first accessing said associated data field descriptors, means responsive to said addressing means for testing said fields of said associated data field descriptors, said testing means identifying the attributes of said associated data fields, and first means responsive to said testing means and said second memory means including:

second means coupled to said first memory means for altering said associated data fields accessed by said addressing means so that they are compatible, and third means coupled to said first memory means for changing said attributes of said associated data field descriptors, said first means operating on said altered associated data fields in accordance with said logical instruction.

2. An apparatus as defined in claim 1 wherein one of said attributes described by said data field descriptors is the data format descriptor of said associated data field, said data format comprising encodings for a plurality of different types, said encodings including alphanumeric strings, unpacked decimal, packed decimal, character string, unsigned short binary, signed short binary, unsigned long binary, signed long binary, short logical binary and long logical binary data formats.

3. An apparatus as defined in claim 1 wherein another of said attributes described by said data field descriptors is a key descriptor, said key descriptor including a plurality of different encodings indicating the dimensionality of said data field.

4. An apparatus as defined in claim 1 wherein a third of said attributes described by said data field descriptors is a length descriptor, said length descriptor describing the length of said data field.

5. An apparatus as defined in claim 1 wherein said data field descriptors are less in number than said data fields.

6. An apparatus for use with data fields having a plurality of different data structures, said apparatus comprising:

memory means for storing signals which represent a logical instruction;

means for performing said logical operation on at least one of said data fields, including:

first and second base registers, first means responsive to signals corresponding to a first portion of said logical instruction for locating a first data field descriptor, second means responsive to a first word in said first data field descriptor, said first word identifying said first base register, said second means locating a corresponding one of said data fields by concatenating the contents of said first base register with said first word, at least a second word in said first data field descriptor describing the attributes of said one data field, third means responsive to signals corresponding to a second portion of said logical instruction for locating a second data field descriptor, fourth means responsive to a third word in said second data descriptor, said third word identifying said second base register, said fourth means locating a corresponding second data field by concatenating the contents of said second base register with said third word, at least a fourth word in said second data field descriptor describing attributes of said second data field, and fifth means responsive to signals corresponding to a third portion of said logical instruction for transmforming at execution time said second data field in accordance with said attributes described by said first data field descriptor.

7. An apparatus as defined in claim 6 wherein said second data field descriptor describes different types of the same attributes of said first data field descriptor.

8. An apparatus as defined in claim 7 wherein said second data field located by said second data field descriptor has a different data format than said first data field located by said first data field descriptor.

9. An apparatus as defined in claim 6 wherein said data field descriptors include length and key field descriptors.

* * * * *